Nov. 10, 1953     A. G. JANOS     2,658,968
COMBINED ILLUMINATION AND MINIMUM TEMPERATURE
CONTROL FOR REFRIGERATORS
Filed Dec. 29, 1950
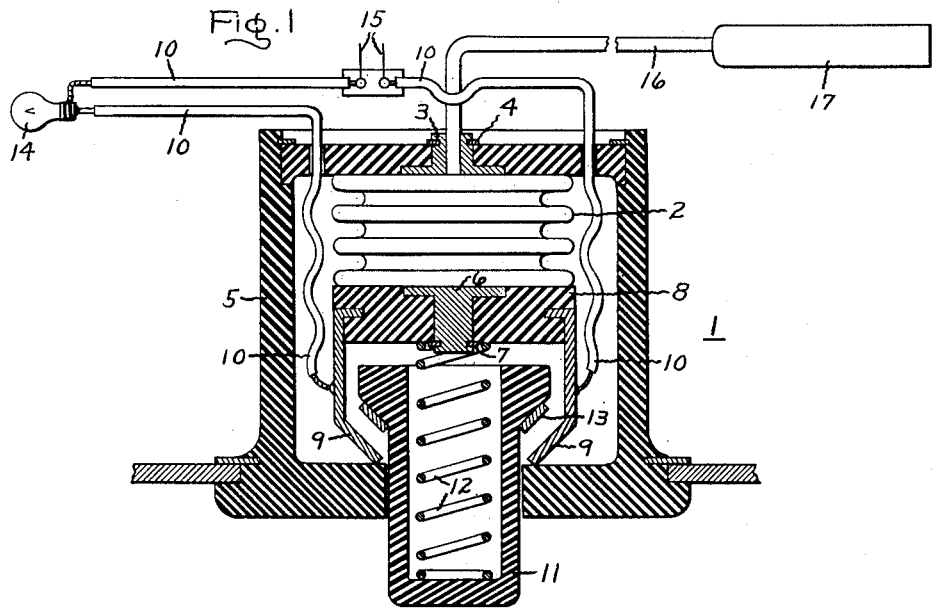
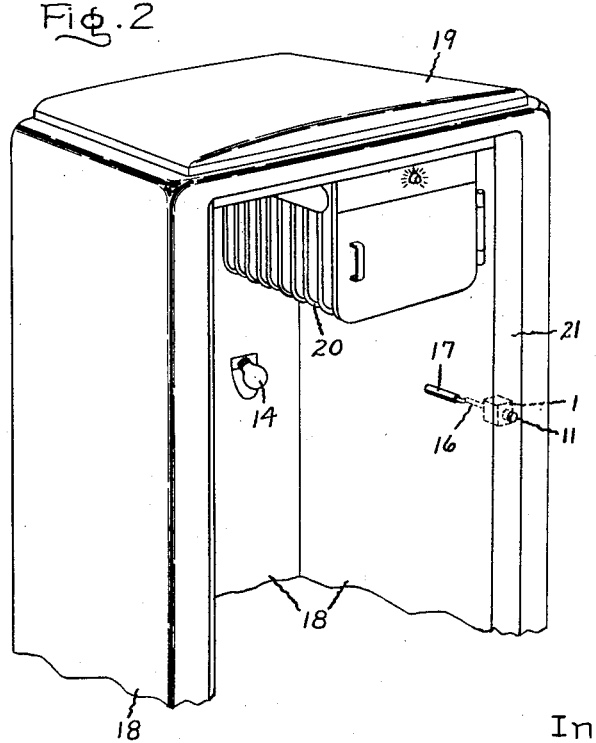
Inventor
Alfred G. Janos
by William G. Edwards, Jr.
His Attorney Patented Nov. 10, 1953

2,658,968

UNITED STATES PATENT OFFICE 2,658,968

COMBINED ILLUMINATION AND MINIMUM TEMPERATURE CONTROL FOR REFRIGERATORS

Alfred G. Janos, Erie, Pa., assignor to General Electric Company, a corporation of New York Application December 29, 1950, Serial No. 203,390

3 Claims. (Cl. 200—61.62)

My invention relates to refrigerators and more particularly to illumination and minimum temperature controls used on refrigerators respectively to illuminate the refrigerated compartment when its door is opened and to prevent unduly low temperatures within the refrigerated compartment.

In most commercial and household refrigerator compartments, a source of illumination, namely, an incandescent electric lamp controlled by a door-actuated switch, is provided so that the source of illumination is turned on when the door is open and turned off when the door is closed.

While the primary purpose of refrigerators is to keep the contents therein below a certain maximum temperature to prevent spoilage, it is often the case that the contents may be adversely affected by temperatures below a certain minimum. Therefore, a secondary purpose of refrigerators is to keep the contents therein above a certain minimum temperature. Such a secondary purpose applies, for example, when a refrigerator contains milk and fresh fruits or vegetables which are damaged by temperatures below 32° F. Refrigerators are sometimes placed where unduly low ambient temperatures are infrequently encountered in the air surrounding the refrigerated cabinet. Such applications include the use of refrigerators in outdoor markets, unheated buildings, or on back porches of homes in climates where the outdoor temperature sometimes falls below the minimum temperature desired in the refrigerated compartment. When these conditions are encountered, it is desirable that the refrigerated compartment be heated to compensate for heat losses to the atmosphere, and thus, to keep the temperature in the refrigerated compartment at or above the minimum temperature desired therein. An excellent and convenient source of heat for this purpose is the aforementioned incandescent lamp, normally used to illuminate the refrigerated compartment, which may be controlled not only by a door-actuated switch but also by a temperature-sensitive switch to generate heat within the compartment when the temperature therein reaches or falls below a predetermined minimum.

This problem has been recognized in the past and solved by arrangements which employ a door actuated switch and a temperature-sensitive switch in parallel, either of which may turn on a lamp within a refrigerated compartment. However, such arrangements call for the use of two separate switches. Furthermore, occasions when the temperature-sensitive switch is required to turn on the lamp are quite infrequent, perhaps at indefinite intervals of months or years, depending upon the location and climate of the area in which the refrigerator is situated. The temperature sensitive switch may, therefore, become corroded and electrically inoperative due to long periods of inactivity in the moist air of the refrigerated compartment.

It is, therefore, an object of my invention to provide illumination and minimum temperature control within a refrigerated compartment by means of a single switch mechanism employing a single mounting and simplified wiring.

It is a further object of my invention to provide illumination and minimum temperature control within a refrigerated compartment by means of an improved switching arrangement which minimizes corrosion of contacts and provides improved reliability of operation of the minimum temperature control.

In carrying out my invention, I provide a single electrical switch to turn on a lamp in a refrigerated compartment both when the door is opened and when the temperature in the refrigerated compartment falls below a predetermined minimum. Both contacts of the switch are movable, one being attached to a spring-backed plunger actuated by the refrigerator door and the other being attached to a temperature sensitive expansion element connected with a temperature sensing member located within the compartment. When the door is opened, the contact on the plunger moves to meet that on the expansion element thus turning on the lamp to illuminate the compartment. When the door is in the closed position and the temperature within the compartment falls to or below a predetermined minimum temperature, the expansion element contracts, moving the contact on the expansion element to meet that on the plunger and, thus, turning on the lamp to supply heat to the compartment. By the use of my arrangement, only one switch must be mounted and wired. The frequent use of the refrigerator door causes the single set of contacts to make and break frequently whereby any corrosion or coating of the contacts is worn away as it occurs. Therefore, no matter how infrequently the temperature sensitive feature of the switch is called into action, positive heating of the lamp will result by virtue of the clean contacts.

For a better understanding of my invention together with further objects and advantages thereof, reference should be had to the following description and to the drawing in which Fig. 1 is a sectional view of a preferred form of the combination electrical switch used in my invention together with a schematic electrical circuit and a temperature sensing bulb, and Fig. 2 is a perspective view of a refrigerator compartment, partially shown and with the door omitted for clarity, employing the combined illumination and minimum temperature control of my invention.

Referring now to Fig. 1 of the drawing, a preferred embodiment of my combination switch 1 is shown comprising a metallic expansion bellows 2 upon one end of which is fastened, by soldering, for instance, a connecting collar 3 which is mounted and held stationary by a spring retainer 4 in an opening of a housing 5 made of suitable insulating material, such as plastic or hard rubber. A second connecting collar 6, fastened by soldering, for instance, upon the free end of bellows 2, together with a spring retainer 7 secures a block of insulation 8 to the bellows 2. Two metallic terminals 9 for two wires 10 are mounted upon block 8 and extend as shown in the drawing. A plunger 11, made of insulating material, is biased outwardly, i. e., downwardly as shown in the drawing, by a spring 12 between the plunger 11 and block 8. It carries a metallic contact ring 13, positioned as shown, and is movably mounted within an opening in the housing 5. If the plunger 11 is made of metal, the necessity of the separate contact ring 13 is eliminated. The wires 10 extend through the housing 5 from the switch mechanism 1 to form an electrical circuit through a lamp 14 and a source of power supply, such as supply conductors 15, when the contact ring 13 contacts the two terminals 9. A tube 16 connects a temperature-sensing bulb 17 with the interior of the bellows 2 through collar 3 and these elements are filled with a non-corrosive thermally expandible fluid, which may be any of those well known to the art as suitable for such applications.

In Fig. 2, there is shown a refrigerator compartment with its door omitted for clarity, formed by insulated walls 18 and a top 19 and containing an evaporator 20 which, in conjunction with a suitable compressing and condensing unit (not shown) serves to refrigerate the compartment. The lamp 14 is mounted on the rear wall of the compartment and is connected by wires positioned within the insulated walls 18 to the combination switch 1 and to the supply conductors 15, in accordance with the illustration of Fig. 1. The combination switch 1 is mounted within one wall 18 so that plunger 11 is biased by spring 12 to protrude from the housing 5 and from the surface 21, which faces the door, when the door is opened, and so that plunger 11 is pushed into the housing 5 against spring 12 by the door when the door is closed. The temperature-sensing bulb 17 is mounted upon an inner wall of the compartment and is connected by tube 16, positioned within the insulated wall, to the bellows 2 within the combination switch 1.

In operation under normal conditions, the plunger 11 is held by the closed door in a depressed position, i. e., an upward position as shown in Fig. 1, so that the contact ring 13 does not contact terminals 9 and lamp 14 is not turned on. When the door is opened, spring 12 pushes plunger 11 outwardly so that contact ring 13 connects terminals 9, thus limiting the travel of plunger 11, completing the circuit, and turning on lamp 14. In the event that the temperature within the compartment falls below a certain predetermined temperature, the fluid within bulb 17, and thus the bellows 2, contracts, moving terminals 9 inwardly, or upwardly as viewed in Fig. 1, until they are connected by contact ring 13 to complete the electrical circuit and turn on lamp 14. Heat generated by lamp 14 raises the temperature within the compartment and when the temperature rises above the predetermined temperature, the expansion of bellows 2 interrupts the circuit and turns off lamp 14.

Frequent opening and closing of the refrigerator door with the resultant operation of the switch 1 will keep the contacting surfaces of terminals 9 and contact ring 13 free of corrosion due to moisture, so that no matter how infrequently the minimum temperature feature of the switch is called into action, positive electrical contact will be made to turn on lamp 14. Thus, my arrangement provides positive combined illumination and minimum temperature control for refrigerators and, at the same time, requires the mounting and wiring of only one switch mechanism.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In a refrigerator including a refrigerated compartment, a door for closing said compartment, an electric lamp arranged to illuminate and heat said compartment, and an electric circuit for said lamp, a single electric switch adapted for being connected in said circuit, said switch having one contact movable in response to the opening of said door and a second cooperating contact movable in response to changing temperature within said compartment for bringing said one contact and said second contact into engagement and thereby completing said circuit either in response to the opening of said door or in response to a temperature change within said compartment.

2. In a refrigerator including a refrigerated compartment, a door for closing said compartment, an electric lamp arranged to illuminate and heat said compartment and an electric circuit for said lamp, a single electric switch adapted for being connected in said circuit, said switch including a bellows arranged to expand and contract in response to temperature changes within said compartment, a spring-biased plunger adapted for being actuated by the opening and closing of said door, and cooperating contacts mounted upon said bellows and said plunger for being brought into engagement and thereby completing said circuit either in response to the opening of said door or in response to a temperature change within said compartment.

3. In a refrigerator including a refrigerated compartment, and a door for closing said compartment, an electric lamp arranged within said compartment to illuminate and heat said compartment; an electric circuit for said lamp, and a temperature-sensing bulb positioned within said compartment and containing a thermally expandable fluid, a single electric switch including a housing, a bellows adapted for being connected to said bulb and having one end mounted on said housing, said bellows being further adapted for expanding and contracting in response to temperature changes in said compartment, two metallic terminals supported on the free end of said bellows and adapted for being connected in said circuit, said housing having an opening therein, a plunger movable through said opening, a metallic contact ring mounted on said plunger, a spring biasing said plunger to an outward position at which said contact ring engages said terminals, said switch being adapted for being positioned within a wall of said compartment with said plunger protruding from a surface facing said door when said door is open, said ring being adapted for engaging said terminals to complete said circuit either in response to the opening of said door or in response to a temperature change within said compartment.

ALFRED G. JANOS.

References Cited in the file of this patent

UNITED STATES PATENTS

| Number | Name | Date |
|---|---|---|
| 2,488,161 | Benson et al. | Nov. 15, 1949 |
| 2,595,967 | McCloy | May 6, 1952 |